(12) United States Patent
Keller (10) Patent No.: US 9,057,661 B2
(45) Date of Patent: Jun. 16, 2015

(54) TIRE PRESSURE OBSERVATION AFTER DETECTING ABNORMAL PRESSURE CONDITION

(71) Applicant: Goodrich Corporation, Charlotte, NC (US)

(72) Inventor: Steven Keller, Union, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/078,215

(22) Filed: Nov. 12, 2013

(65) Prior Publication Data

US 2015/0128691 A1 May 14, 2015

(51) Int. Cl.
*B60C 23/02* (2006.01)
*G01M 17/02* (2006.01)
*B64F 5/00* (2006.01)

(52) U.S. Cl.
CPC ............. *G01M 17/02* (2013.01); *B64F 5/0045* (2013.01)

(58) Field of Classification Search
USPC ........................................................ 73/146.5
See application file for complete search history.

(56) References Cited

U.S. PATENT DOCUMENTS

| | | | | |
|---|---|---|---|---|
| 2,955,635 | A * | 10/1960 | Miller | 152/457 |
| 4,334,215 | A * | 6/1982 | Frazier et al. | 340/447 |
| 5,483,827 | A * | 1/1996 | Kulka et al. | 73/146.5 |
| 5,731,754 | A * | 3/1998 | Lee et al. | 340/447 |
| 6,087,930 | A * | 7/2000 | Kulka et al. | 340/447 |
| 7,002,455 | B2 * | 2/2006 | Buck et al. | 340/442 |
| 7,181,366 | B2 * | 2/2007 | Rimkus et al. | 702/183 |
| 7,197,922 | B2 * | 4/2007 | Rimkus et al. | 73/146 |
| 7,218,209 | B2 * | 5/2007 | Utter et al. | 340/442 |
| 7,437,921 | B2 * | 10/2008 | Delaporte | 73/146.5 |
| 8,279,055 | B2 * | 10/2012 | Isomura | 340/442 |
| 8,736,466 | B2 * | 5/2014 | Lamping et al. | 340/945 |
| 2005/0088293 | A1 * | 4/2005 | Buck et al. | 340/445 |
| 2006/0041344 | A1 * | 2/2006 | Ooba | 701/29 |
| 2006/0220813 | A1 * | 10/2006 | Utter et al. | 340/442 |
| 2006/0235651 | A1 * | 10/2006 | Rimkus et al. | 702/183 |
| 2006/0260389 | A1 * | 11/2006 | Rimkus et al. | 73/146 |
| 2006/0260390 | A1 * | 11/2006 | Oflaz | 73/146 |
| 2008/0178667 | A1 * | 7/2008 | Kusunoki | 73/146.4 |
| 2008/0288696 | A1 * | 11/2008 | Abt | 710/267 |
| 2009/0102636 | A1 * | 4/2009 | Tranchina | 340/447 |
| 2010/0300192 | A1 * | 12/2010 | Isomura | 73/146.3 |
| 2014/0172342 | A1 * | 6/2014 | Yu et al. | 702/104 |

\* cited by examiner

*Primary Examiner* — Lisa Caputo
*Assistant Examiner* — Jamel Williams
(74) *Attorney, Agent, or Firm* — Snell & Wilmer L.L.P.

(57) ABSTRACT

A tire pressure observation method and computer readable medium is provided. Upon detection of an abnormal pressure condition, a tire pressure observation method provides for various maintenance actions. A computer readable medium may contain instructions for a tire pressure observation controller directing the controller to present messages at different stages of the maintenance actions to assist maintenance staff in properly performing the maintenance actions, for example, observing the tire pressure.

11 Claims, 6 Drawing Sheets

| STATE | ACTION |
|---|---|
| 601 Abnormally High | Send message: "Deflate" |
| 603 Okay | Send message: "Tire Okay" |
| 605 Normal Low | Send message: "Reinflate" |
| 607 Abnormal Low | Send message: "Maintenance Required" |
| 609 Error | Send message: "Sensor Error" |
| 611 Wait | Send message: "Out of Service for Maintenance Test" |
| 613 Assess | Send message: "Perform Maintenance Assessment" |
| 615 Repair/Replace | Send message: "Repair/Replace" |
| 617 Return to Service | Send message: "Return to Service" |

FIG. 6

TIRE PRESSURE OBSERVATION AFTER DETECTING ABNORMAL PRESSURE CONDITION

FIELD

The present disclosure relates to tire systems and, more specifically, to a tire pressure monitoring system for use with tires of aircraft landing gear.

BACKGROUND

Aircraft tires will degrade rapidly if they are operated beyond their intended operating pressure ranges. Accordingly, a tire manufacturer will specify a normal operating pressure range and one or inure unacceptable pressure ranges. If a tire is determined to be in an unacceptable pressure range, maintenance action is often required. Some maintenance actions require close observation of the tire by personnel and some maintenance actions require a lengthy waiting period in which a tire's ability to maintain pressure is evaluated and the aircraft is not moved. Thus, there is a potential that the maintenance action will not be completed, or will be improperly completed, or will be forgotten.

SUMMARY

Systems and methods disclosed herein may be useful in tire pressure monitoring systems. In this regard, a system is provided comprising a sensor, a controller, and an output device.

In various embodiments, a method for tire pressure observation comprises accepting user timing settings, starting a timer, setting a logical state to a WAIT state, causing the timer to run until the timer expires, changing the wait state logical state to an ASSESS state logical state in response to the expiring.

In various embodiments, a method for tire pressure observation comprises measuring a first tire pressure level, characterizing the first tire pressure level as abnormally low, setting at least one logical state to a first value to indicate the characterizing, setting a timer in response to the logical state and starting the timer wherein the starting further comprises setting at least one logical state to a second value to indicate that the timer is running, and setting the at least one logical state to a third value in response to the timer elapsing to indicate that the timer is elapsed. In various embodiments, the method may further comprise additional steps. For example, the method may further comprise performing at least one subsequent maintenance action in response to the setting at least one logical state to a third value.

In various embodiments, a method for the pressure observation comprises measuring a first tire pressure level, characterizing the first tire pressure level as abnormally low, setting at least one logical state to a first value to indicate the characterizing, setting a timer in response to the logical state and starting the timer wherein the starting further comprises setting at least one logical state to a second value to indicate that the timer is running, and setting the at least one logical state to a third value in response to the timer elapsing to indicate that the timer is elapsed, measuring a second tire pressure level, characterizing the second tire pressure level as abnormally low, and setting at least one logical state to a fourth value in response to the second tire pressure.

In various embodiments, an article of manufacture including a non-transitory, tangible computer readable storage medium having instructions stored thereon that, in response to execution by a computer-based system (e.g., a processor and/or tire pressure observation controller), cause the computer-based system to be capable of performing operations comprising receiving, by the tire pressure observation controller, a first tire pressure level from a tire pressure sensor, characterizing, by the tire pressure observation controller, the first tire pressure level as abnormally low, setting, by the tire pressure observation controller, at least one logical state to a first value to indicate the characterizing, setting, by the tire pressure observation controller, a timer in response to the logical state and starting the timer wherein the starting further comprises setting at least one logical state to a second value to indicate that the timer is running, and setting, by the tire pressure observation system, the at least one logical state to a third value in response to the timer elapsing to indicate that the timer is elapsed. In various embodiments, the computer readable medium may further comprise additional instructions, for example, additional instructions that, when executed by a tire pressure observation controller, cause the tire pressure observation controller to send a message to a the pressure observation output device indicating at least one subsequent maintenance action in response to the setting at least one logical state to a third value.

In various embodiments, an article of manufacture including a non-transitory, tangible computer readable storage medium having instructions stored thereon that, in response to execution by a computer-based system (e.g., a processor and/or tire pressure observation controller), cause the computer-based system to be capable of performing operations comprising receiving, by the tire pressure observation controller, a first tire pressure level from a tire pressure sensor, characterizing, by the tire pressure observation controller, the first tire pressure level as abnormally low, setting, by the tire pressure observation controller, at least one logical state to a first value to indicate the characterizing, setting, by the tire pressure observation controller, a timer in response to the logical state and starting the timer wherein the starting further comprises setting, by the tire pressure observation controller, at least one logical state to a second value to indicate that the timer is running, and setting, by the tire pressure observation controller, the at least one logical state to a third value in response to the timer elapsing to indicate that the timer is elapsed, receiving, by the tire pressure observation controller, a second tire pressure level from a tire pressure sensor, characterizing, by the tire pressure observation controller, the second tire pressure level as abnormally low, and setting, by the tire pressure observation controller, at least one logical state to a fourth value in response to the second tire pressure.

BRIEF DESCRIPTION OF THE DRAWINGS

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact for similar phrases) may also include reduced contact or minimal contact. As used herein, phrases such as "make contact with," "coupled to," "touch," "interface with" and "engage" may be used interchangeably.

Figure 1:
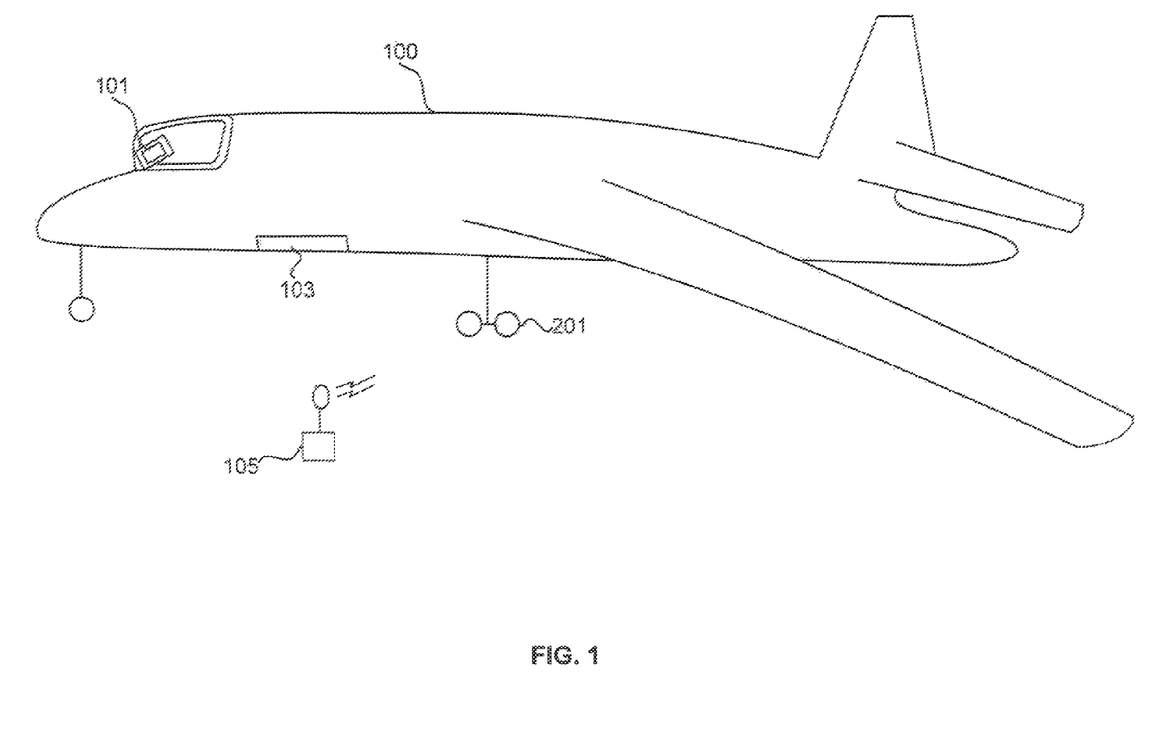
FIG. 1 illustrates a view of an aircraft and various components in accordance with various embodiments.
Figure 2:
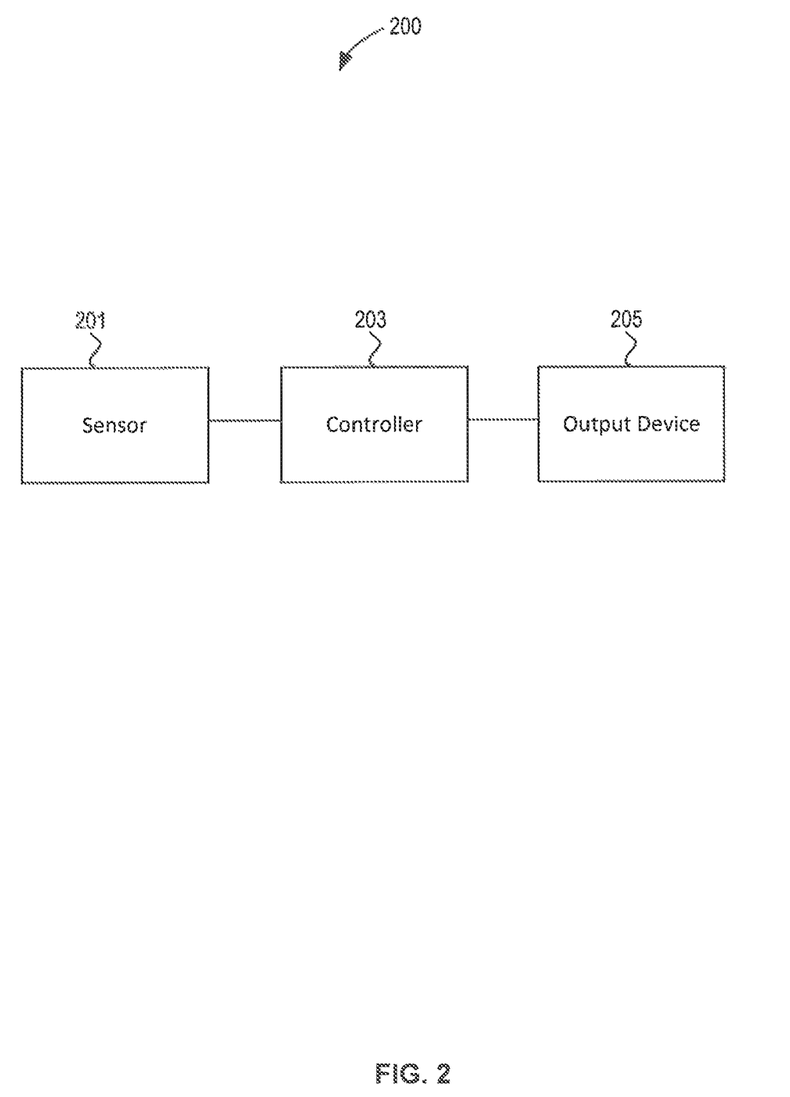
FIG. 2 illustrates various components of a tire pressure monitoring system, in accordance with various embodiments.

With reference to FIGS. 1 and 2, aircraft 100 may comprise one or more types of aircraft wheel and brake assemblies. In various embodiments, an aircraft wheel and brake assembly may comprise a tire pressure monitoring system 200. Furthermore, a tire pressure monitoring system may comprise a sensor 201, a controller 203, and an output device 205. In various embodiments, sensor 201 is a tire pressure sensor in electrical communication and/or radio frequency (RF) communication with at least one tire to monitor the pressure of at least one tire and provide data to a controller 203. In various embodiments, the controller 203 is a tire pressure observation controller. In various embodiments, the controller 203 is in electrical communication and/or RF communication with the sensor 201 to process data provided by the sensor 201. In various embodiments, the output device 205 is in electrical communication and/or RF communication with the controller 203 to provide a human readable output and/or a machine readable output based on the data provided by the sensor 201 to the controller 203. In various embodiments, the output device 205 may comprise a maintenance panel 103 on an aircraft, for example, a maintenance data display unit externally mounted on the aircraft for access by ground crews. In various embodiments, the output device 205 may comprise a cockpit panel 101 on the aircraft, for example a crew-alert system (CAS), or an engine-indication and crew-alert system (EICAS), or a multifunction display (MFD) any other output device panel. Moreover, in various embodiments the output device may comprise a portable device 105 (alone, or in addition to cockpit panel 101), such as a receiver or transceiver that could be carried by maintenance personnel, for example, a maintenance data receiver in RF or wired communication with controller 203. As shown in FIG. 1, portable device 105 is capable of both RF communication and wired (i.e., electrical) communication with controller 203 and/or sensor 201. In various embodiments, controller 203 and output device 205 may both be located within portable device 105. In various embodiments, controller 203 may be located on or in an aircraft and output device 205 may be located within portable device 105. Moreover, any arrangement or configuration of sensor 201, controller 203, and output device 205 may be contemplated in accordance with the principles disclosed herein.

Controller 203 may comprise a tire pressure observation controller. For example, controller 203 may comprise a module that comprises a processor, a non-transitory, tangible memory, and logic such as maintenance logic. Controller 203 may receive data from sensor 201, and/or other sensors or aircraft systems. Controller 203 may then implement various logic, such as maintenance logic.

Maintenance logic is incorporated into system 200. In various embodiments, this logic is incorporated in to sensor 201. In various embodiments, this logic is incorporated into controller 203. In various embodiments, this logic is incorporated into both sensor 201 and controller 203.

Figure 3:
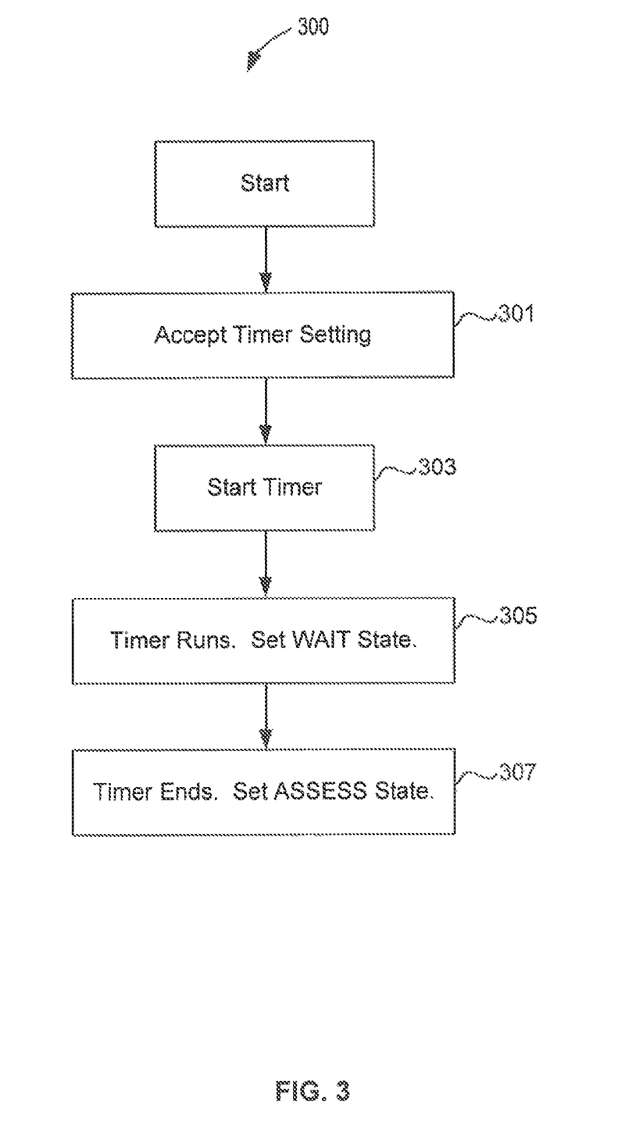
FIG. 3 illustrates a logical flowchart of various operations of a tire pressure system observation routine performed by a tire pressure monitoring system, in accordance with various embodiments.
Figure 4:
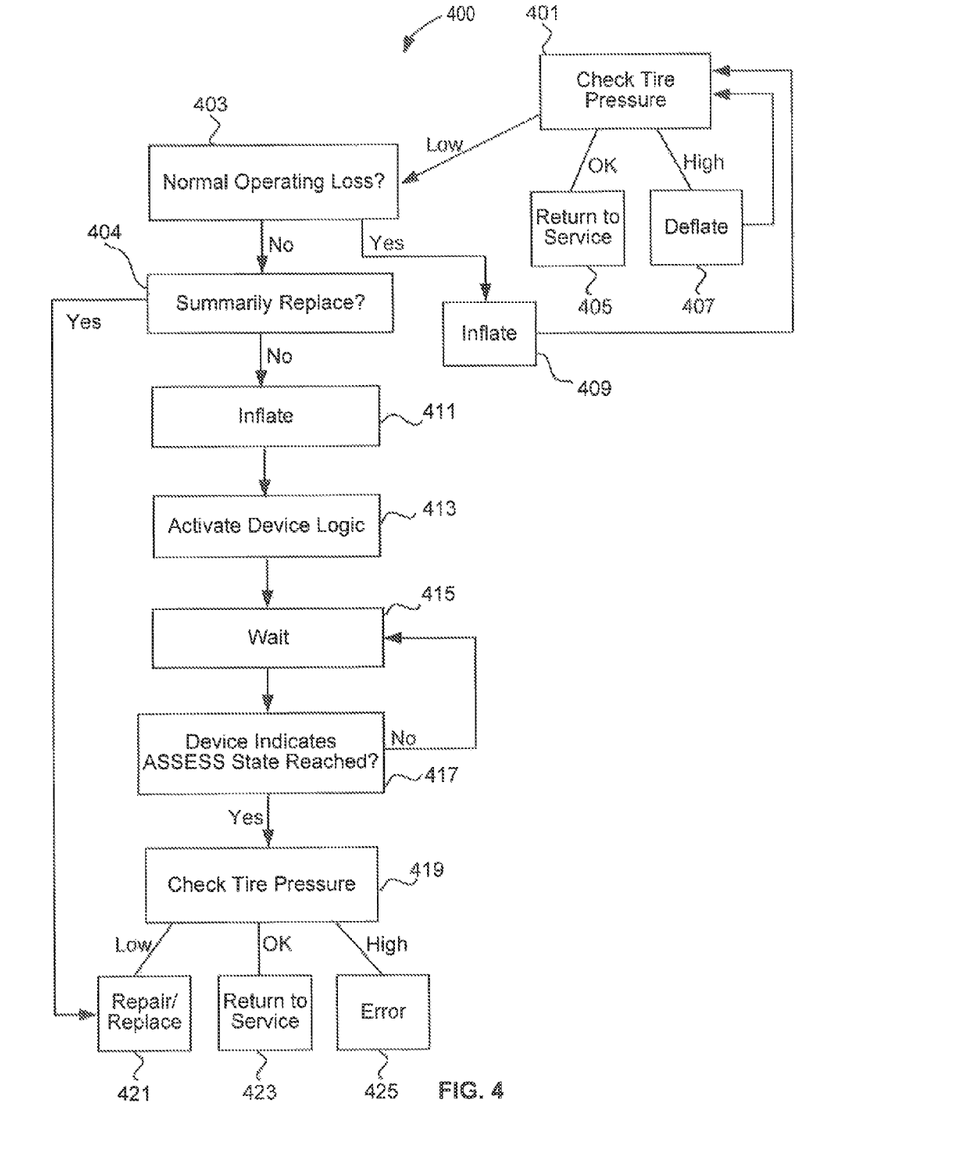
FIG. 4 illustrates a logical flowchart of a maintenance workflow wherein a tire pressure monitoring system is utilized, in accordance with various embodiments.

For example, maintenance routine 400 is illustrated in FIG. 4. At least one tire pressure is checked (step 401). In general, an OEM, aircraft manufacturer, tire manufacturer, regulatory entity, and/or other party defines an acceptable pressure range and at least one unacceptable pressure range for a tire. For example, an acceptable pressure range may be 150 pounds-per-square-inch (PSI) (~1,034 kPa)-155 PSI (~1068 kPa). Moreover, an OEM, aircraft manufacturer, tire manufacturer, regulatory entity, and/or other party defines an acceptable daily pressure loss for a tire. For example, an acceptable daily pressure loss may be 10 PSI (~69 kPa). If the tire pressure is greater than the acceptable pressure range, the maintenance routine may proceed to step 407, and the tire may be partially deflated. If the tire pressure is within the acceptable pressure range, then the maintenance routine may terminate and the tire may be returned to service (step 405). However, if the tire pressure is low, the maintenance scenario may proceed to determining whether the tire pressure is sufficiently low to indicate a pressure loss greater than a normal operating loss (step 403). If it is determined that the tire pressure indicates a pressure loss within a normal operating loss, the scenario proceeds to step 409, and the tire is may be partially reinflated. However, if the tire pressure is sufficiently low to indicate a greater than normal operating loss, in various embodiments, a tire pressure monitoring system observation routine is then followed, for example as shown in FIG. 3. Alternatively, if there is insufficient time or resources to perform a tire pressure monitoring system observation routine, or if a tire is immediately determined to be unusable, for example, because it is destroyed, the tire may be summarily replaced (step 404 and step 421).

Upon identification that a tire pressure is sufficiently low to indicate a greater than normal operating loss, a maintenance protocol may be initiated wherein the tire is reinflated (step 411) to within the acceptable pressure range, and device logic is activated (step 413). In various embodiments, the device logic comprises a tire pressure monitoring system observation routine, for example, as shown in FIG. 3. After a predetermined period of time elapses (step 415), the tire pressure is checked again to identify whether the tire pressure remains in the acceptable pressure range (step 419), or whether the tire has deflated so that the pressure indicates greater than a normal operating loss. In various embodiments, the predetermined period of time is 24 hours, in various exemplary embodiments, the predetermined period of time is 12 hours, or overnight, or any other period sufficient to permit evaluation of a tire for potential pressure loss, for example, 1 hour-24 hours.

Accordingly, with reference to FIG. 3, a logical flowchart illustrates various steps of a tire pressure monitoring system observation routine performed by tire pressure monitoring system 200. In various embodiments, a tire pressure monitoring system observation routine includes accepting a timer setting (step 301), and an electronic timer is started (step 303). With additional reference to FIG. 6, while the tinier runs, system 200 sets a logical state to the WAIT state 611. In various embodiments, when the timer ends, system 200 changes the logical state to the ASSESS state 613 (step 307).

With reference again to FIG. 4, in response to the ASSESS state 613 being reached (step 417), an exemplary maintenance routine may conclude with rechecking the pressure of at least one tire (step 419) upon receiving an indication that system 200 is in the ASSESS state 613 logical state. If the rechecking of the pressure indicates that the tire pressure is low, a repair or replacement step may begin (step 421). If the tire pressure remains within the acceptable pressure range, then the maintenance scenario may terminate with the tire returned to service (step 423). If the tire pressure is greater than the acceptable pressure range, an error may be indicated (step 425) as it is likely that an anomalous event has occurred, for example, the tire or the tire pressure monitoring system 200 underwent tampering while system 200 was in the WAIT state 611 (step 305).

Figure 5:
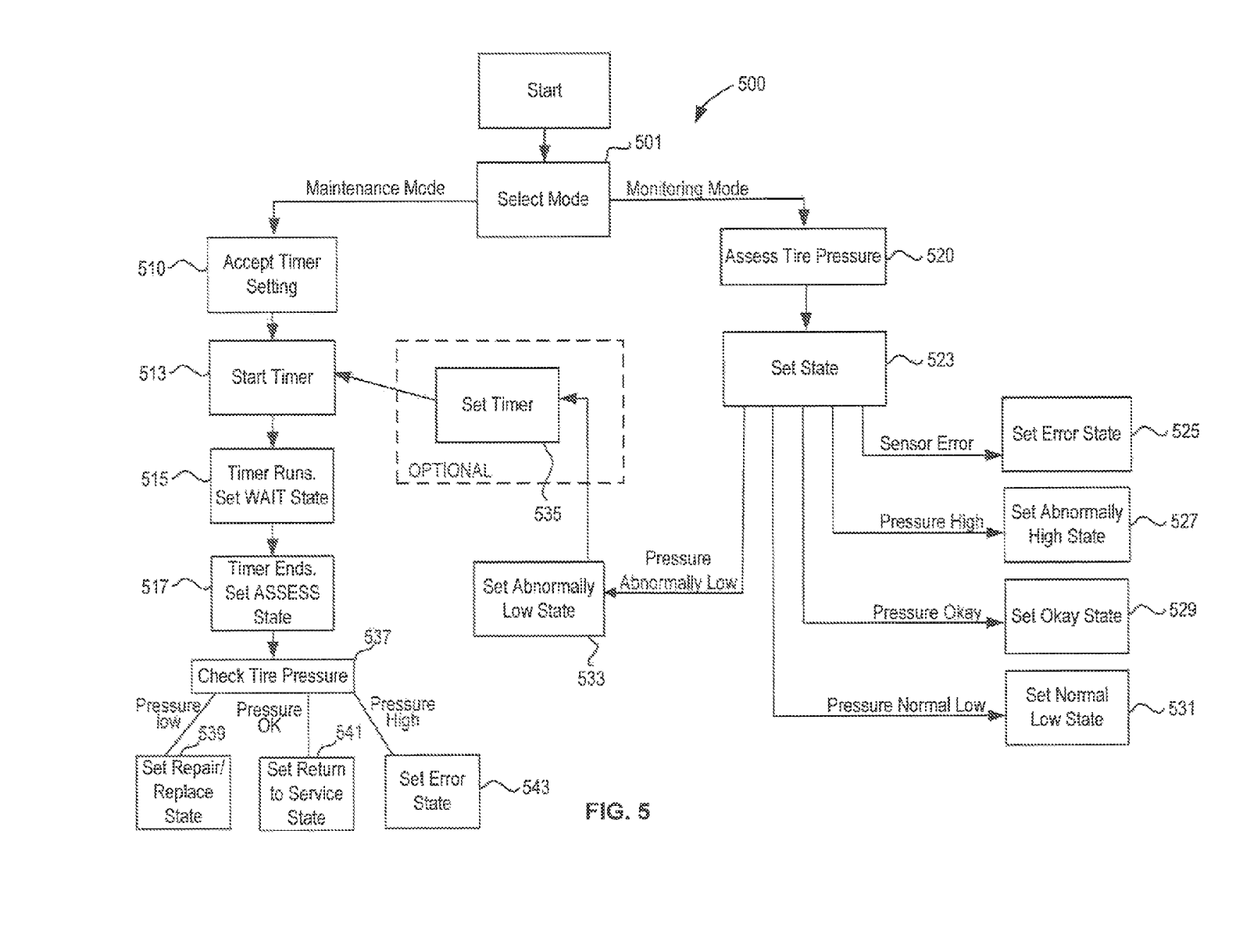
FIG. 5 illustrates a logical flowchart of various operations performed by a tire pressure monitoring system incorporating and automating various aspects maintenance workflow, in accordance with various embodiments.

With reference to FIG. 5, in various embodiments, the steps referenced in FIG. 4 are combined with the steps referenced in FIG. 3 to provide an automatic diagnostic routine 500 for implementation of the tire pressure monitoring system observation routine in a tire pressure monitoring system 200 with enhanced automation. For example, a tire pressure monitoring system 200 may have a memory and processor implementing logic wherein a selecting step includes the selection of a mode of operation (step 501). In various embodiments, this selecting may be effected by input of an electronic signal. In various embodiments, this selecting may be effected by the mechanical movement of a switch by a user. In various embodiments this selecting may be effected by automatic triggering by a system 200 process or another aircraft system. In various embodiments, if a maintenance mode is selected, the exemplary tire pressure monitoring system 200 performs various steps illustrated by the logical flowchart, identical to those steps performed by an exemplary tire pressure monitoring system 200 operating according to FIGS. 3 and 4, as discussed herein above.

For example, upon identification that a tire is sufficiently low to indicate a greater than normal operating loss, a maintenance protocol is initiated wherein the tire is reinflated to within the acceptable pressure range, and after a predetermined period of time elapses, the tire pressure is checked again to identify whether the tire pressure remains in the acceptable pressure range, or whether the tire has deflated so that the pressure indicates greater than a normal operating loss. Accordingly, in various embodiments of a tire pressure monitoring system 200, a tire pressure monitoring system observation routine includes wherein a timer setting is accepted (step 510), and an electronic timer is started (step 513). With additional reference to FIG. 6, while the timer runs, system 200 sets a logical state to the WAIT state 611, in various embodiments, when the timer ends, system 200 changes the logical state to the ASSESS state 613 (step 517).

However, if a monitoring mode is selected, the exemplary tire pressure monitoring system 200 performs various steps illustrated by the logical flowchart wherein at least one tire pressure is checked (step 520) by sensor 201. Controller 203 then sets the state of system 200 depending on the data received from sensor 201. For example, if a sensor error is indicated, controller 203 sets the system state to ERROR state 609 (step 525). If sensor 201 indicates that the tire pressure is high, controller 203 sets the system state to ABNORMALLY HIGH 607 (step 527). If sensor 201 indicates that the tire pressure is in the acceptable pressure range, controller 203 sets the system state to OKAY 603 (step 529). If sensor 201 indicates that the tire pressure is low, but is within a normal operating loss, controller 203 sets the system state to NORMAL LOW 605 (step 529). If sensor 201 indicates that the tire pressure is low and is outside a normal operating loss, controller 203 sets the system state to ABNORMALLY LOW 607 (step 533). In various embodiments, the ABNORMALLY LOW state 607 triggers an additional step wherein the controller automatically initiates a tire pressure monitoring system observation routine wherein the controller 203 automatically configures tinier settings (step 535), and an electronic timer is automatically started (step 513). With additional reference to FIG. 6, while the timer runs, system 200 sets a logical state to the WAIT state 611. In various embodiments, when the timer ends, system 200 changes the logical state to the ASSESS state 613 (step 517).

Figure 6:
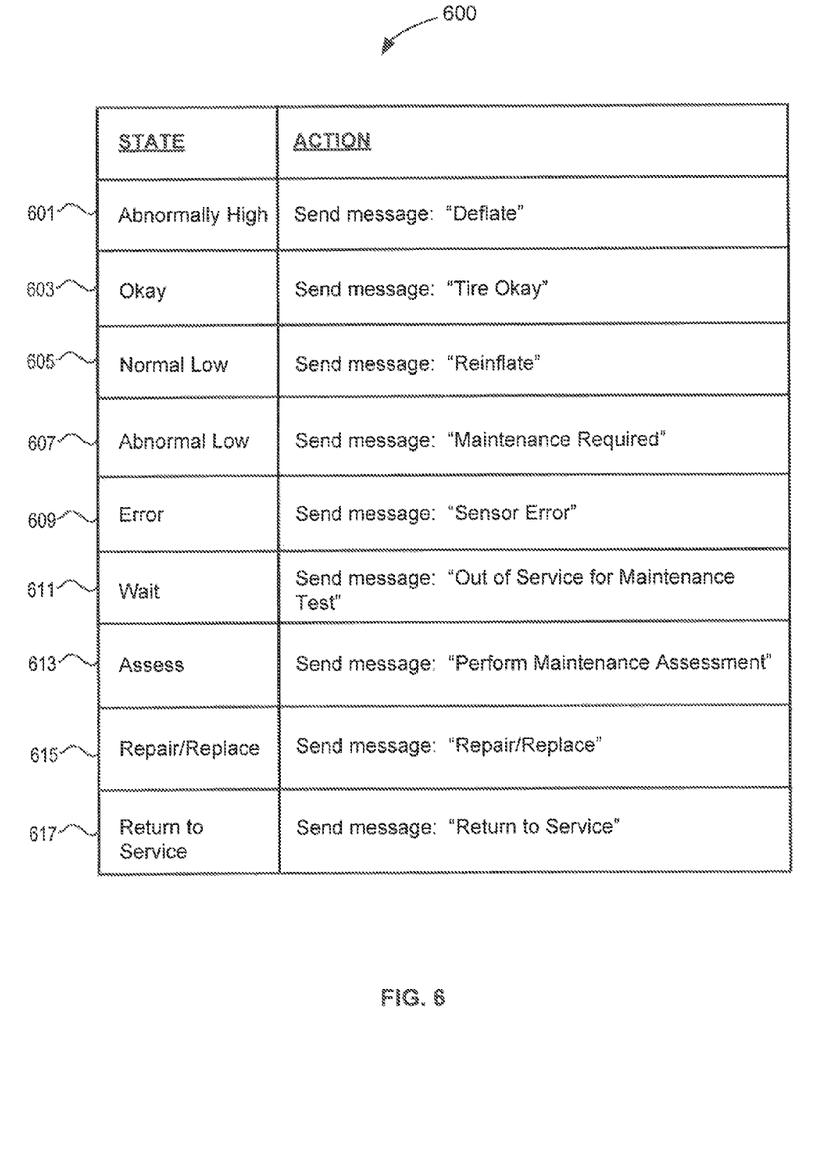
FIG. 6 illustrates a chart of various logical states and output actions of a tire pressure monitoring system, in accordance with various embodiments.

At this point, in various embodiments an exemplary maintenance scenario may conclude with the sensor automatically rechecking the pressure of at least one tire (step 537) upon receiving an indication that the system 200 is in the ASSESS state 613 logical state. If the rechecking of the pressure indicates that the tire pressure is low, a REPAIR/REPLACE state 615 logical state may be set (step 539). Alternatively, if the tire pressure remains within the acceptable pressure range, then a RETURN TO SERVICE state 617 logical state may be set (step 541). Alternatively, if the tire pressure is greater than the acceptable pressure range, an ERROR state 609 logical state may be set (step 543) as it is likely that an anomalous event has occurred, for example, the tire or the tire pressure monitoring system 200 experienced a system fault or underwent tampering, for example, undesired inflation of a tire while in the WAIT state 611.

Now, with reference to FIG. 6, the various logical states of system 200 may trigger an output action, for example, the display of a message on an output device 205. For example, upon entering an ABNORMALLY HIGH state 601, controller 203 may transmit a message to output device 205 indicating an instruction to deflate the tire. For example, upon entering an OKAY state 603, controller 203 may transmit a message to output device 205 indicating an instruction to return the tire to service. For example, upon entering an NORMAL LOW state 605, controller 203 may transmit a message to output device 205 indicating an instruction that maintenance is required, for example, reinflation. Upon entering an ABNORMALLY LOW state 607, controller 203 may transmit a message to output device 205 indicating an instruction that maintenance is required, for example, a maintenance routine, or the setting and starting of a tinier, for example, according to FIG. 5, steps 535 and 513, and FIG. 3, steps 301 and 303. In various embodiments, the entering of the NORMAL LOW state 605 triggers additional operations, for example additional steps and processes, for example, according to FIG. 5. Upon entering an ERROR state 609, controller 203 may transmit a message to output device 205 indicating a system fault or possible tampering, for example, inflation of a tire while system was in a WAIT state 611 logical state. Upon entering a WAIT state 611, controller 203 may transmit a message to output device 205 indicating that a maintenance routine is underway and the indicating that a user take a particular action, for example, refraining from moving an aircraft and waiting for a timer to elapse. Upon entering an ASSESS state 613, controller 203, may transmit a message to output device 205 indicating that a timer has elapsed and indicating that the user undertake a particular action, for example, checking the pressure of an inflated tire to determine possible pressure loss. In some embodiments, upon entering an ASSESS state 613, controller 203 automatically communicates with sensor 201 to automatically check a tire pressure to automatically determine possible pressure loss, for example, according to the check tire pressure step 537. Upon entering a REPAIR/REPLACE state 615, controller 203 may transmit a message to output device 205 indicating that the maintenance personnel should repair at least one tire, or replace at least one tire. Upon entering a RETURN TO SERVICE 617 state, controller 203 may transmit a message to output device 205 indicating that the tire is in an operable condition and should be returned to service, for example, permitting an aircraft to again be moved. Thus, in accordance with the principles discussed herein, it is apparent that any number of additional or different states may be entered and upon entering any state, controller 203 may undertake additional operations, for example, additional steps and processes may be triggered by the setting of a logical state.

With specific reference to the WAIT state 611 and the RETURN TO SERVICE state 617, in various exemplary embodiments, the WAIT state 611 is accompanied by presenting a message on output device 205 alerting personnel of the ongoing maintenance action. With momentary reference to FIG. 4, maintenance personnel may then at step 415, wait for the output device 205 to indicate that the timer period is expired (step 417). In various embodiments, the maintenance action requires that the airplane not be moved during the maintenance action, thus in various embodiments, the message may comprise a message configured to alert personnel of this condition. In various embodiments, upon conclusion of the timer interval, system 200 may proceed to terminate the tinier and enter an ASSESS state 613. In this regard, maintenance personnel may be alerted to not undertake actions which might compromise the ongoing maintenance action while the system 200 is in the WAIT state 611.

In various embodiments, while the tire pressure monitoring systems described herein have been described in the context of aircraft applications; however, one will appreciate in light of the present disclosure, that the system described herein may be used in connection with various other vehicles, for example, cars, trucks, busses, trains, boats, and submersible vehicles, or any other vehicle or device, having maintenance protocols involving waiting periods between actions, or having systems needing regular inspection, for example pressurized tires, or other pressurized vessels or compartments.

A tire pressure monitoring system may include built-in testing logic. Built-in testing logic may comprise logic to perform certain tests (i.e., diagnostics) to determine whether the tire pressure monitoring system is in a malfunctioning state. Built-in testing logic may reside in a sensor or a controller, such as controller 203, or any other component of a tire pressure monitoring system or other system in communication with the tire pressure monitoring system. Built-in testing logic may also include safety features which use aircraft status information to verify that the tire pressure monitoring system is in condition for testing.

As used herein, the meaning of the term "non-transitory computer-readable medium" should be construed to exclude only those types of transitory computer-readable media which were found in *In re Nuijten*, 500 F.3d 1346 (Fed. Cir. 2007) to fall outside the scope of patentable subject matter under 35 U.S.C. §101, so long as and to the extent *In re Nuijten* remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A method for tire pressure observation comprising:
   accepting, by a tire pressure observation controller, timing settings;
   starting, by the tire pressure observation controller, and in response to acceptance of the timing settings, a timer;
   setting, by the tire pressure observation controller, a logical state to a WAIT state logical state;

causing, by the tire pressure observation controller, the timer to run until the timer expires;

changing, by the tire pressure observation controller, the logical state from a WAIT state logical state to an ASSESS state logical state in response to the timer expiring; and sending, by the tire pressure observation controller, a message to an output device in response to setting the logical state to the WAIT state, wherein the tire pressure observation controller is installed on an aircraft and wherein the message comprises an instruction to refrain from moving the aircraft.

2. The method of claim 1, further comprising sending, by the tire pressure observation controller, a message to the output device in response to setting the logical state to the ASSESS state.

3. The method according to claim 1, wherein the output device is a cockpit crew-alert system.

4. The method according to claim 1, wherein the output device is a portable device in RF communication with the tire pressure observation controller.

5. The method according to claim 1, wherein setting the timer comprises setting the timer to run for 1 hour to 24 hours.

6. An article of manufacture including a non-transitory, tangible computer readable storage medium having instructions stored thereon that, in response to execution by a tire pressure observation controller, cause the tire pressure observation controller to be capable of performing operations comprising:

receiving, by the tire pressure observation controller, a first tire pressure level from a tire pressure observation sensor;

characterizing, by the tire pressure observation controller, the first tire pressure level as abnormally low;

setting, by the tire pressure observation controller, a first logical state to a first value in response to the characterizing the first tire pressure level;

setting, by the tire pressure observation controller, a timer in response to the first logical state and starting the timer wherein the starting further comprises setting the first logical state to a second value to indicate that the timer is running;

setting, by the tire pressure observation controller, the first logical state to a third value in response to the timer expiring; and sending, by the tire pressure observation controller, a message to a tire pressure observation output device requesting a subsequent maintenance action in response to the setting the first logical state to the third value.

7. The non-transitory, tangible computer readable storage medium of claim 6, wherein setting the timer comprises setting the timer to run for a period of 24 hours.

8. The non-transitory, tangible computer readable storage medium of claim 6, wherein the maintenance action comprises an instruction to evaluate a second tire pressure level.

9. An article of manufacture including a non-transitory, tangible computer readable storage medium having instructions stored thereon that, in response to execution by a tire pressure observation controller, cause the tire pressure observation controller to be capable of performing operations comprising:

receiving, by the tire pressure observation controller, a first tire pressure level from a tire pressure observation sensor;

characterizing, by the tire pressure observation controller, the first tire pressure level as abnormally low;

setting, by the tire pressure observation controller, a first logical state to a first value in response to the characterizing the first tire pressure level;

setting, by the tire pressure observation controller, a timer in response to the first logical state and starting the timer wherein the starting further comprises setting the first logical state to a second value to indicate that the timer is running;

setting, by the tire pressure observation controller, the first logical state to a third value in response to the timer expiring;

receiving, by the tire pressure observation controller, a second tire pressure level from the tire pressure observation sensor;

characterizing, by the tire pressure observation controller, the second tire pressure level as abnormally low; and setting, by the tire pressure observation controller, the first logical state to a fourth value in response to the characterizing the second tire pressure level.

10. The non-transitory, tangible computer readable storage medium, of claim 9, wherein the fourth value comprises a REPAIR/REPLACE state.

11. The non-transitory, tangible computer readable storage medium of claim 9, further comprising sending, by the tire pressure observation controller, a message to a tire pressure observation output device indicating at least one subsequent maintenance action in response to the setting the first logical state to the third value.

\* \* \* \* \*